United States Patent
Huettel et al.

(10) Patent No.: US 7,177,093 B2
(45) Date of Patent: Feb. 13, 2007

(54) AFOCAL ZOOM SYSTEM

(75) Inventors: Peter Huettel, Jena (DE); Johannes Winterot, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 11/015,793

(22) Filed: Dec. 17, 2004

(65) Prior Publication Data
US 2005/0134970 A1  Jun. 23, 2005

(30) Foreign Application Priority Data
Dec. 19, 2003 (DE) ............................... 103 59 733

(51) Int. Cl.
  *G02B 15/14* (2006.01)
  *G02B 15/16* (2006.01)
  *G02B 21/00* (2006.01)
(52) U.S. Cl. ............... 359/683; 359/380; 359/686; 359/744
(58) Field of Classification Search ........... 359/380, 359/686, 683, 696, 699, 744
  See application file for complete search history.

(56) References Cited

U.S. PATENT DOCUMENTS

| 4,198,129 | A | * | 4/1980 | Vockenhuber | ............... 359/698 |
| 4,802,717 | A | | 2/1989 | Kebo | |
| 5,353,157 | A | | 10/1994 | Horiuchi | |
| 5,659,426 | A | | 8/1997 | Aoki | |
| 5,798,872 | A | | 8/1998 | Uzawa | |
| 6,157,495 | A | | 12/2000 | Kawasaki | |
| 6,320,702 | B1 | | 11/2001 | Yonezawa | |
| 6,335,833 | B1 | | 1/2002 | Kawasaki | |
| 6,392,816 | B1 | * | 5/2002 | Hamano | ............... 359/683 |

FOREIGN PATENT DOCUMENTS

| DE | 198 37 135 | 4/1999 |
| DE | 202 07 780 | 8/2002 |

* cited by examiner

*Primary Examiner*—Scott J. Sugarman
*Assistant Examiner*—Darryl J. Collins
(74) *Attorney, Agent, or Firm*—Reed Smith LLP

(57) ABSTRACT

The invention is directed to an afocal zoom system, particularly for use in microscopes, comprising at least four optical assemblies, two of which assemblies are movable relative to one another and to the rest of the assemblies for the purpose of changing the magnification. It is the object of the invention to develop an afocal zoom system which enables a relatively small structural size for a microscope also in combination with a suitable drive mechanism. This object is met by an afocal zoom system of the type described above in which every adjustable magnification can be achieved by a displacing movement of the two movable optical assemblies in the same direction.

12 Claims, 7 Drawing Sheets

Magnification range: 12.5x 0.32-4.0

Magnification range: 14.8x 0.32-4.75

Magnification range: 17.0x 0.32-5.43

Magnification range: 20.0x 0.30-6.00

Magnification range: 25.0x 0.30-7.50

Magnification range: 30.0x 0.30-9.00

Magnification range: 35.0x 0.30-10.50

AFOCAL ZOOM SYSTEM

CROSS-REFERENCE TO RELATED APPLICATION

This application claims priority of German Application No. 103 59 733.6, filed Dec. 19, 2003, the complete disclosure of which is hereby incorporated by reference.

BACKGROUND OF THE INVENTION a) Field of the Invention

The invention is directed to an afocal zoom system, particularly for use in microscopes, comprising at least four optical component groups or assemblies, two of which are movable relative to one another and relative to the rest of the assemblies for purposes of changing magnification.

b) Description of the Related Art

Afocal zoom systems are known per se. They are used for the purposes changing magnification in conventional microscopes as one-channel systems or in stereo microscopes and surgical microscopes in two-channel construction according to the type of telescope. In contrast to Greenough type stereo microscopes using two objectives and two separate microscope beam paths which are inclined relative to one another at an angle of 12° to 14°, the telescope type is an embodiment form that is outfitted with a main objective common to both beam paths, the object lying in the object-side focal plane of the main objective. In this case, two partial bundles which are parallel to one another are cut out of the parallel light bundles offered by the objective in such a way that their axes which converge in front of the objective form the required angle of 12° to 14° and generate two real intermediate images considered at this angle.

Because of their limiting structural constraints, afocal zoom systems differ from photographic, video and telescopic systems and must therefore be classed in a special field of technology. In particular, the limited permissible lens diameter in two-channel constructions does not allow existing zoom systems already used in the fields and product groups mentioned above to be transferred to microscopy.

Afocal zoom systems with four optical assemblies and a zoom factor greater than 8 are often used in microscopes. Systems such as these are described, for example, in DE 202 07 780 U1, U.S. Pat. No. 6,320,702 B1, U.S. Pat. No. 6,157,495 and U.S. Pat. No. 6,335,833 B1.

Considered from the object, the systems indicated in these references are similarly formed of a stationary first group with positive refractive power, a movable second group with negative refractive power, a movable third group with positive refractive power, and a stationary fourth group with negative refractive power. The two middle groups are moved in opposite directions relative to one another in order to change the magnification. The magnification decreases when the distance between the two movable groups is increased.

All of the prior art publications cited above relate to this basic construction and this movement characteristic of the two movable assemblies.

Most of the space available for the entire zoom system is claimed by the movement areas of the movable assemblies. For example, the movement range in the zoom system according to U.S. Pat. No. 6,335,833 B1 is about 102 mm, while the overall length of the system and, therefore, the installed dimension, is about 150 mm.

This has the disadvantage that a space-saving construction of the components required for guiding the movable optical assemblies is not possible, which prevents a reduction of the structural dimensions of the microscopes. This applies particularly to microscopes in which the zoom system and the associated drive unit may not exceed predetermined dimensions.

OBJECT AND SUMMARY OF THE INVENTION

On this basis, it is the primary object of the invention to develop an afocal zoom system which enables a relatively small structural size for a microscope also in combination with a suitable drive mechanism.

This object is met by an afocal zoom system of the type mentioned above in which every adjustable magnification can be achieved by means of a displacing movement of the two movable optical assemblies in the same direction.

In this way, in connection with a drive arrangement, a smaller constructional space than was previously possible in the art can be realized. This is because the moving optical assemblies are usually spatially oriented on two rods. In this case, a carrier with a receptacle for an optical assembly is designed in such a way that it encloses one of the rods as a sleeve and touches the second rod as a means for preventing rotation. As a result, the free length of the rods is greater than the movement length of the optical assembly and the length of the sleeve.

When the carriers move in opposite directions, the guide lengths are summed and are accordingly greater than the space required for the optical assemblies. This prevents a reduction in the structural dimensions of the microscopes. However, when the two carriers move in the same direction, it is possible to guide them on two parallel rods without these rods needing to be longer than the optical installation space.

In a first embodiment, the afocal zoom system according to the invention comprises four optical assemblies, of which, beginning on the object side or infinity space from the objective, a first assembly is stationary with positive refractive power, a second assembly is movable with negative refractive power, a third assembly is stationary with positive refractive power, and a fourth assembly is movable with negative refractive power.

It is advantageously provided that the two movable assemblies are movable at different displacement speeds and the lowest possible magnification is adjusted when the two movable assemblies are displaced farthest in the direction of the first assembly.

In a second embodiment, the afocal zoom system according to the invention comprises five optical assemblies, of which, beginning on the object side, a first assembly is stationary with positive refractive power, a second assembly is movable with negative refractive power, a third assembly is stationary with positive refractive power, a fourth assembly is movable with negative refractive power, and a fifth assembly is stationary with positive refractive power.

It is also provided in this case that the two movable assemblies are movable at different displacement speeds and, again, the magnification is lowest when both movable assemblies are displaced farthest in the direction of the first assembly.

It should be mentioned that, in principle, the zoom system can also be arranged in the reverse sequence of optical assemblies in the microscope beam path, in which case, beginning on the image side or in infinity space from the tube lens, the first assembly is arranged first.

The movable assemblies can optionally be connected to drive devices in any of the zoom systems described according to the invention. These drive devices are constructed in the form of drum cams, as a rack and pinion with positive control by means of a cam disk, as a positive control by means of a plurality of cam disks, as a direct motor drive, preferably in the form of a stepper motor, or as a lever system with differential movement and positive control by means of a cam disk.

The afocal zoom system according to the invention will be described more precisely in the following with reference to a number of examples in the accompanying drawings.

DESCRIPTION OF THE PREFERRED EMBODIMENTS

Figure 1:
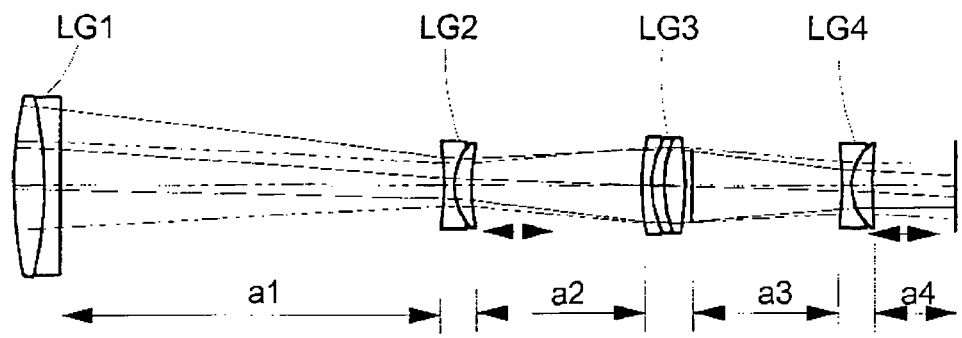
FIG. 1 shows a first constructional variant with four optical assemblies and a structural length of 130 mm.

The zoom system according to the invention shown in FIG. 1 comprises four optical assemblies with a structural length of 130 mm and has the following system specifications:

| Plane or lens group | Radius r | Thickness d | Variable distance | Index of refraction $n_e$ | Abbe number $v_e$ |
|---|---|---|---|---|---|
| Infinity space from objective | | | | | |
| LG1 | 55.83000 | | | | |
| | | 4.50000 | | 1.530190 | 76.58 |
| | −55.83000 | | | | |
| | | 2.30000 | | 1.584820 | 40.57 |
| | infinity | | | | |
| | | | a1 | | |
| LG2 | −35.22750 | | | | |
| | | 1.40000 | | 1.747910 | 44.57 |
| | 9.17300 | | | | |

-continued

| Plane or lens group | Radius r | Thickness d | Variable distance | Index of refraction $n_e$ | Abbe number $v_e$ |
|---|---|---|---|---|---|
| | | 2.50000 | | 1.812659 | 25.16 |
| | 25.12050 | | | | |
| | | | a2 | | |
| LG3 | 30.06750 | | | | |
| | | 1.50000 | | 1.812659 | 25.16 |
| | 15.07000 | | | | |
| | | 1.80000 | | 1.489140 | 70.23 |
| | 18.96900 | | | | |
| | | 2.90000 | | 1.716160 | 53.61 |
| | −44.98960 | | | | |
| Aperture | | 1.00000 | | | |
| | infinity | | | | |
| | | | a3 | | |
| LG4 | −47.65660 | | | | |
| | | 1.30000 | | 1.620680 | 49.54 |
| | 7.94400 | | | | |
| | | 2.90000 | | 1.624080 | 36.11 |
| | 41.86920 | | | | |
| | | | a4 | | |
| Infinity space from tube lens | | | | | |

In FIG. 1 and in all of the following illustrations, the optical assemblies, beginning from the object side in each instance, are designated by LG1 to LG4 or LG5. Assemblies LG2 and LG4 are always movable in the direction of the optical axis of the zoom system in relation to the rest of the assemblies and, to this end, are coupled with drives, preferably stepper motors.

Figure 2:
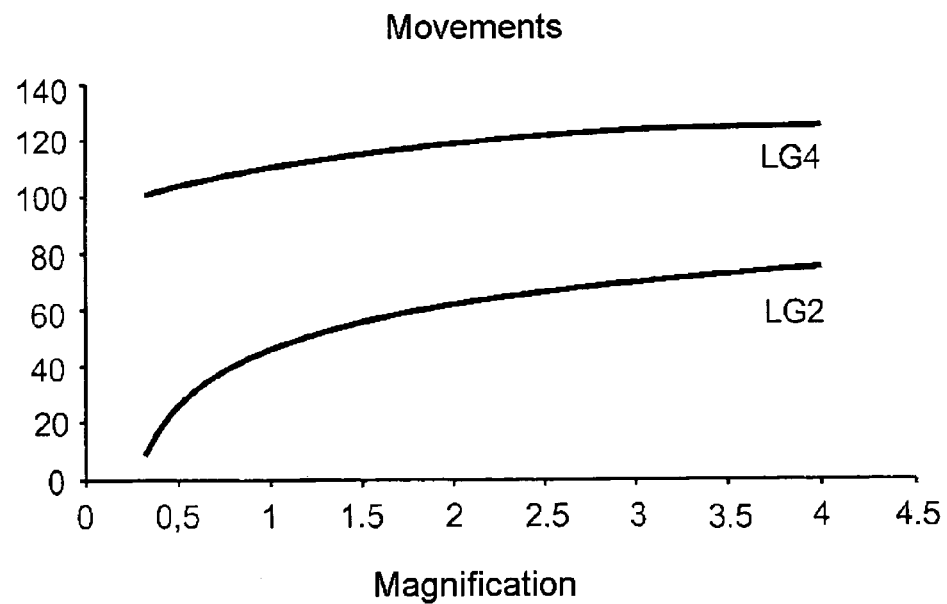
FIG. 2 shows the movement characteristic of the zoom system from FIG. 1.

The movement characteristic of the zoom system from FIG. 1 is shown in FIG. 2. It can be seen from this that the initial magnification value is 0.32 and the final value is 4.0 and the magnification range is accordingly 12.5×. Selected magnifications result with the following distance settings:

| | Magnification | | |
|---|---|---|---|
| | 4.0× | 1.0× | 0.32× |
| a1 | 68.657 | 39.472 | 2.098 |
| a2 | 11.189 | 40.373 | 77.747 |
| a3 | 28.039 | 12.818 | 3.104 |
| a4 | 0.016 | 15.237 | 24.951 |

Figure 3:
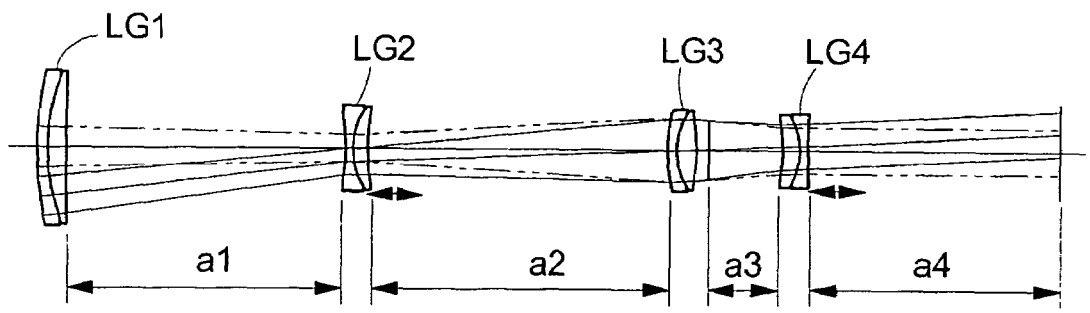
FIG. 3 shows a second constructional variant with four optical assemblies and a structural length of 160 mm.

The zoom system according to the invention shown in FIG. 3 comprises four optical assemblies at a structural length of 160 mm and has the following system specifications:

| Plane or lens group | Radius r | Thickness d | Variable distance | Index of refraction $n_e$ | Abbe number $v_e$ |
|---|---|---|---|---|---|
| Infinity space from objective | | | | | |
| LG1 | 56.75149 | | | | |
| | | 1.80000 | | 1.584820 | 40.57 |
| | 34.34561 | | | | |
| | | 3.23632 | | 1.487940 | 84.07 |
| | 399.82663 | | | | |
| | | | a1 | | |
| LG2 | −42.51193 | | | | |
| | | 1.20000 | | 1.747910 | 44.44 |

-continued

| Plane or lens group | Radius r | Thickness d | Variable distance | Index of refraction $n_e$ | Abbe number $v_e$ |
|---|---|---|---|---|---|
| | 12.24683 | | | | |
| | | 2.43354 | | 1.812639 | 25.16 |
| | 35.41005 | | | | |
| | | | a2 | | |
| LG3 | 27.81808 | | | | |
| | | 1.50000 | | 1.616640 | 44.27 |
| | 11.53722 | | | | |
| | | 3.35345 | | 1.530190 | 76.58 |
| | −38.54358 | | | | |
| Aperture | | 2.00000 | | | |
| | infinity | | | | |
| | | | a3 | | |
| LG4 | −35.44956 | | | | |
| | | 2.96303 | | 1.652220 | 33.60 |
| | −11.34526 | | | | |
| | | 1.30000 | | 1.620680 | 49.54 |
| | 82.22593 | | | | |
| | | | a4 | | |
| Infinity space from tube lens | | | | | |

Figure 4:
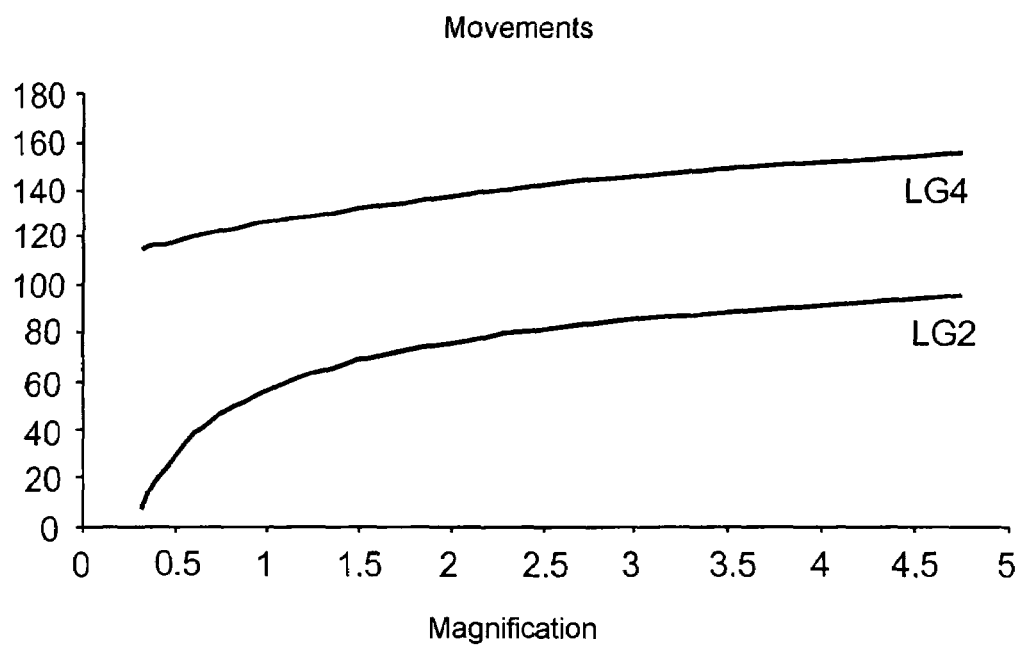
FIG. 4 shows the movement characteristic of the zoom system from FIG. 3.

The movement characteristic of the zoom system from FIG. 3 is shown in FIG. 4. It can be seen that the initial magnification value is 0.32 and the final value is 4.75 and the magnification range is accordingly 14.8×. Selected magnifications result with the following distance settings:

| | Magnification | | |
|---|---|---|---|
| | 4.75× | 1.25× | 0.32× |
| a1 | 90.889 | 57.703 | 2.392 |
| a2 | 5.936 | 39.122 | 94.433 |
| a3 | 44.126 | 17.262 | 2.244 |
| a4 | 0.000 | 26.864 | 41.882 |

Figure 5:
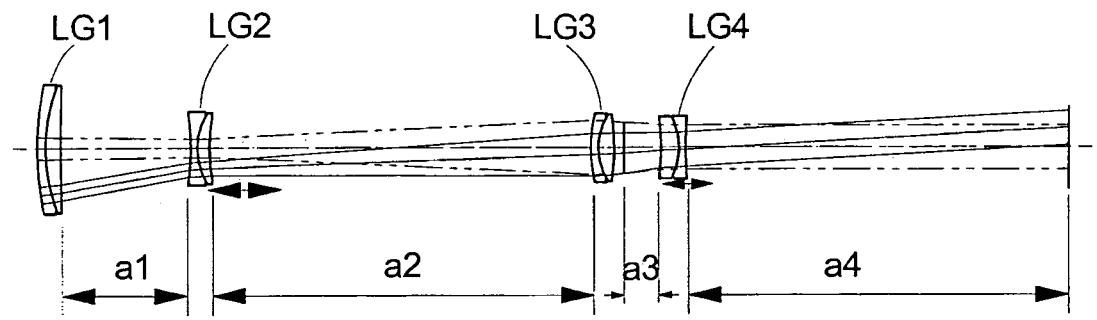
FIG. 5 shows a third constructional variant with four optical assemblies and a structural length of 197 mm.

The zoom system according to the invention shown in FIG. 5 comprises four optical assemblies at a structural length of 197 mm and has the following system specifications:

| Plane or lens group | Radius r | Thickness d | Variable distance | Index of refraction $n_e$ | Abbe number $v_e$ |
|---|---|---|---|---|---|
| Infinity space from objective | | | | | |
| LG1 | 59.45081 | | | | |
| | | 1.80000 | | 1.584820 | 40.57 |
| | 36.56531 | | | | |
| | | 3.09611 | | 1.487940 | 84.07 |
| | 323.75358 | | | | |
| | | | a1 | | |
| LG2 | −47.70503 | | | | |
| | | 1.20000 | | 1.747910 | 44.44 |
| | 13.26264 | | | | |
| | | 2.44516 | | 1.812639 | 25.16 |
| | 37.95059 | | | | |
| | | | a2 | | |
| LG3 | 31.52821 | | | | |
| | | 1.50000 | | 1.616640 | 44.27 |
| | 13.05517 | | | | |
| | | 3.14976 | | 1.530190 | 76.58 |
| | −46.21433 | | | | |
| Aperture | | 2.00000 | | | |
| | infinity | | | | |
| | | | a3 | | |
| LG4 | −46.50621 | | | | |
| | | 3.63255 | | 1.652220 | 33.60 |
| | −13.80465 | | | | |
| | | 1.30000 | | 1.620680 | 49.54 |
| | 86.38284 | | | | |
| | | | a4 | | |
| Infinity space from tube lens | | | | | |

Figure 6:
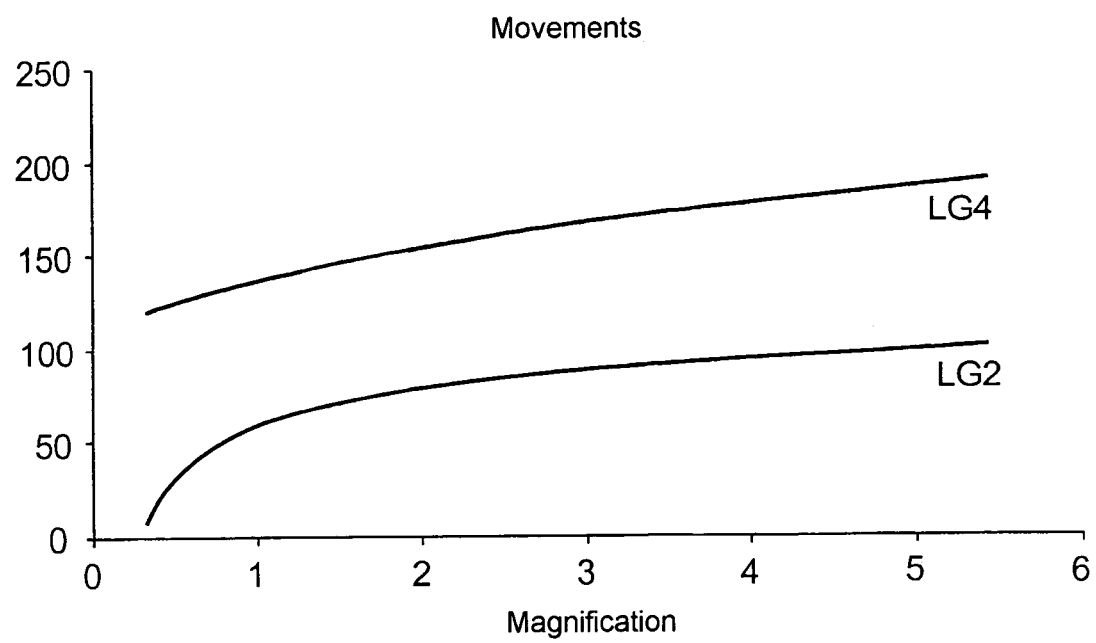
FIG. 6 shows the movement characteristic of the zoom system from FIG. 5.

The movement characteristic of the zoom system from FIG. 5 is shown in FIG. 6. It can be seen that the initial magnification value is 0.32 and the final value is 5.43 and the magnification range is accordingly 17.0×. Selected magnifications result with the following distance settings:

| | Magnification | | |
|---|---|---|---|
| | 5.43× | 1.27× | 0.32× |
| a1 | 90.390 | 61.772 | 2.409 |
| a2 | 5.284 | 40.902 | 100.265 |
| a3 | 73.960 | 23.866 | 2.328 |
| a4 | 0.000 | 50.094 | 71.632 |

Figure 7:
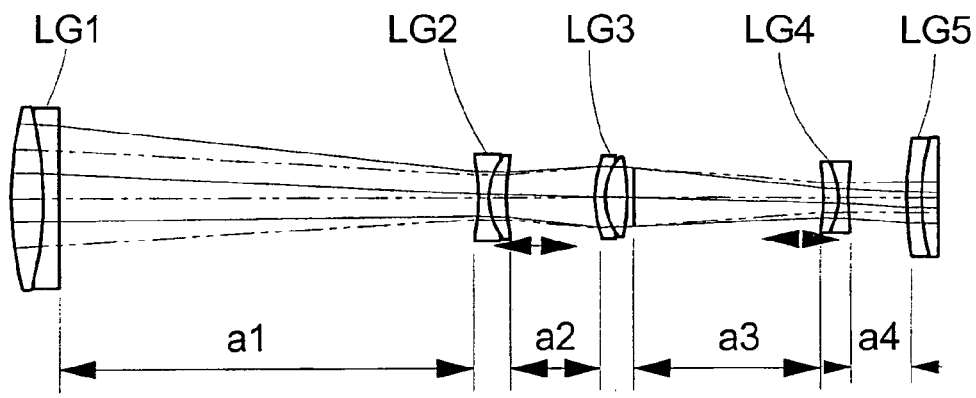
FIG. 7 shows a first constructional variant with five optical assemblies and a structural length of 130 mm.

The zoom system according to the invention shown in FIG. 7 comprises five optical assemblies at a structural length of 130 mm and has the following system specifications:

| Plane or lens group | Radius r | Variable d | Thickness distance | Index of refraction $n_e$ | Abbe number $v_e$ |
|---|---|---|---|---|---|
| Infinity space from objective | | | | | |
| LG1 | 55.83000 | | | | |
| | | 4.50000 | | 1.530190 | 76.58 |
| | −55.83000 | | | | |
| | | 2.30000 | | 1.584820 | 40.57 |
| | infinity | | | | |
| | | | a1 | | |
| LG2 | −29.63900 | | | | |
| | | 1.40000 | | 1.747910 | 44.57 |
| | 9.57600 | | | | |
| | | 2.50000 | | 1.812659 | 25.16 |
| | 28.59370 | | | | |
| | | | a2 | | |
| LG3 | 17.66550 | | | | |
| | | 1.40000 | | 1.708240 | 39.12 |
| | 9.44240 | | | | |
| | | 3.15000 | | 1.530190 | 76.58 |
| | −30.94640 | | | | |
| Aperture | | 1.00000 | | | |
| | infinity | | | | |
| | | | a3 | | |
| LG4 | −27.97950 | | | | |
| | | 2.10000 | | 1.812659 | 25.16 |
| | −10.59190 | | | | |
| | | 1.30000 | | 1.747910 | 44.57 |
| | 38.12900 | | | | |
| | | | a4 | | |
| LG5 | 54.24520 | | | | |
| | | 2.05000 | | 1.708240 | 39.12 |
| | 33.25480 | | | | |

-continued

| Plane or lens group | Radius r | Variable d | Thickness distance | Index of refraction $n_e$ | Abbe number $v_e$ |
|---|---|---|---|---|---|
| | infinity | 2.28000 | | 1.489140 | 70.23 |
| Infinity space from tube lens | | | | | |

Figure 8:
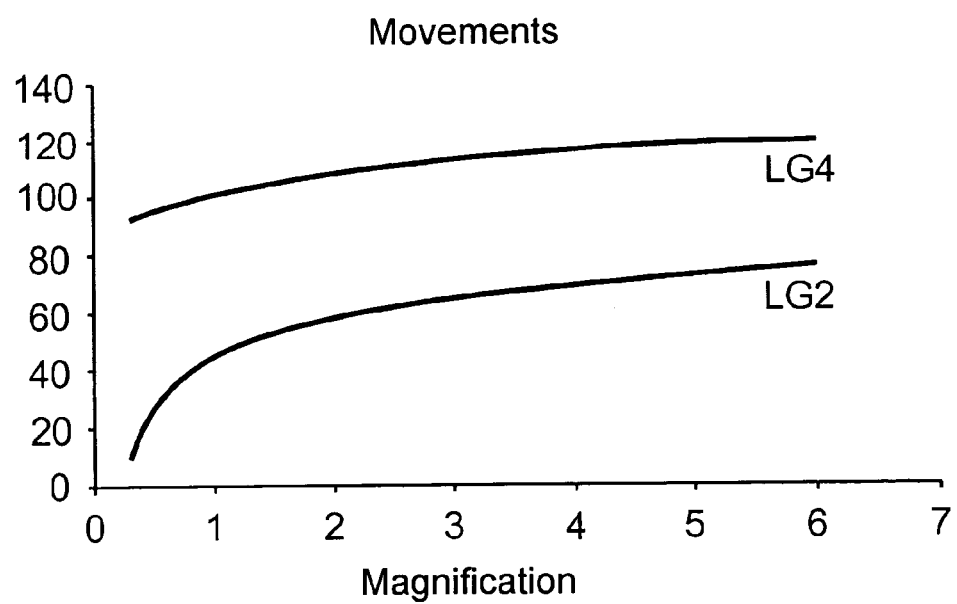
FIG. 8 shows the movement characteristic of the zoom system from FIG. 7.

The movement characteristic of the zoom system from FIG. 7 is shown in FIG. 8. It can be seen that the initial magnification value is 0.3 and the final value is 6.0 and the magnification range is accordingly 20.0×. Selected magnifications result with the following distance settings:

| | Magnification | | |
|---|---|---|---|
| | 6.00× | 2.00× | 0.30× |
| a1 | 69.713 | 51.441 | 2.608 |
| a2 | 2.034 | 20.306 | 69.139 |
| a3 | 32.226 | 20.448 | 4.346 |
| a4 | 2.047 | 13.824 | 29.927 |

Figure 9:
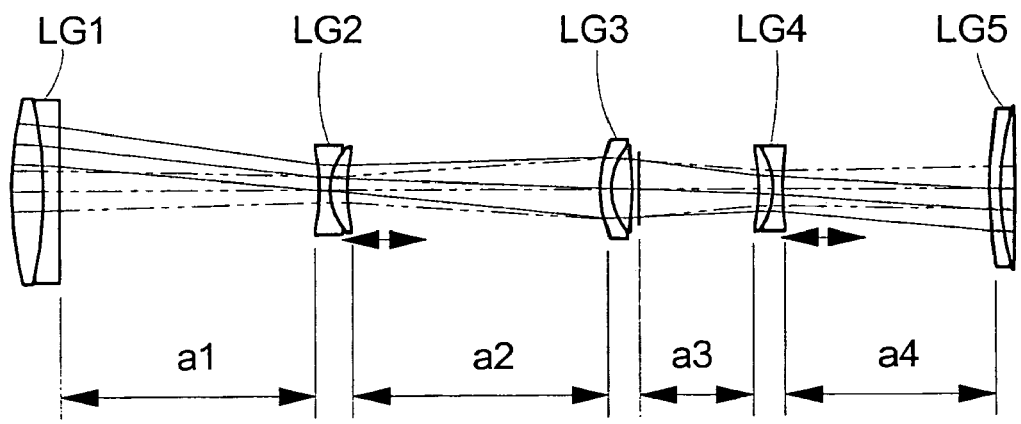
FIG. 9 shows a second constructional variant with five optical assemblies and a structural length of 140 mm.

The zoom system according to the invention shown in FIG. 9 comprises five optical assemblies at a structural length of 140 mm and has the following system specifications:

| Plane or lens group | Radius r | Thickness d | Variable distance | Index of refraction $n_e$ | Abbe number $v_e$ |
|---|---|---|---|---|---|
| Infinity space from objective | | | | | |
| LG1 | 54.46484 | | | | |
| | | 4.50000 | | 1.530190 | 76.58 |
| | −54.53767 | | | | |
| | | 2.30000 | | 1.584820 | 40.57 |
| | 95114.5695 | | | | |
| | | | a1 | | |
| LG2 | −28.70630 | | | | |
| | | 1.40000 | | 1.747910 | 44.57 |
| | 8.84044 | | | | |
| | | 2.50000 | | 1.812659 | 25.16 |
| | 26.08074 | | | | |
| | | | a2 | | |
| LG3 | 17.64930 | | | | |
| | | 1.55000 | | 1.708240 | 39.12 |
| | 9.44423 | | | | |
| | | 3.00000 | | 1.530190 | 76.58 |
| | −33.13612 | | | | |
| | | 1.00000 | | | |
| Aperture | infinity | | | | |
| | | | a3 | | |
| LG4 | −26.24859 | | | | |
| | | 2.10000 | | 1.812659 | 25.16 |
| | −10.15678 | | | | |
| | | 1.30000 | | 1.747910 | 44.57 |
| | 39.51109 | | | | |
| | | | a4 | | |
| LG5 | 73.94310 | | | | |
| | | 1.50000 | | 1.708240 | 39.12 |
| | 42.44389 | | | | |
| | | 2.00000 | | 1.489140 | 70.23 |
| | −320.03785 | | | | |

-continued

| Plane or lens group | Radius r | Thickness d | Variable distance | Index of refraction $n_e$ | Abbe number $v_e$ |
|---|---|---|---|---|---|
| Infinity space from tube lens | | | | | |

Figure 10:
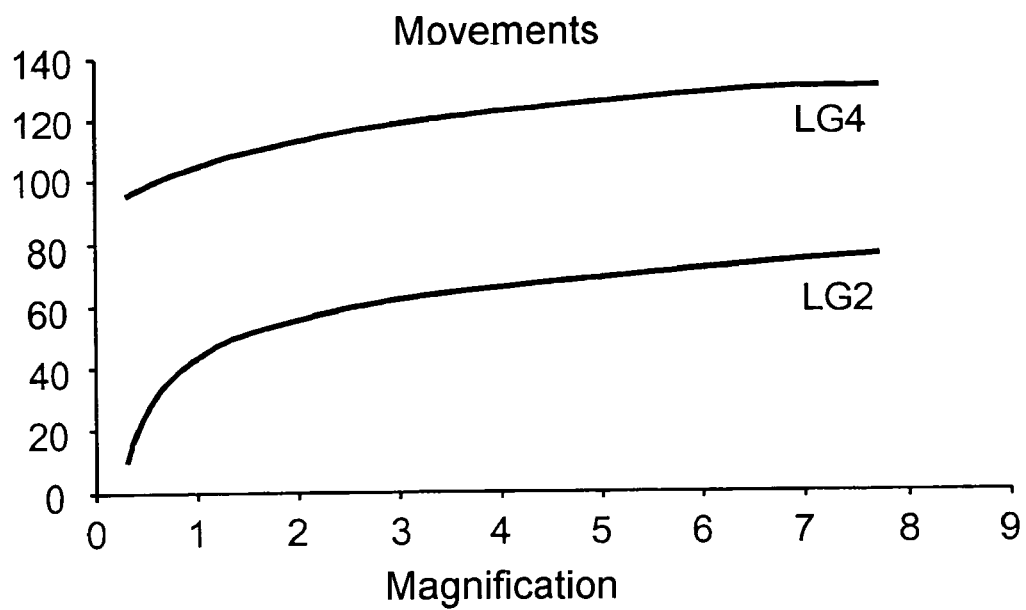
FIG. 10 shows the movement characteristic of the zoom system from FIG. 9.

The movement characteristic of the zoom system from FIG. 9 is shown in FIG. 10. It can be seen that the initial magnification value is 0.30 and the final value is 7.50 and the magnification range is accordingly 25.0×. Selected magnifications result with the following distance settings:

| | Magnification | | |
|---|---|---|---|
| | 7.50× | 3.08× | 0.30× |
| a1 | 69.688 | 56.394 | 3.216 |
| a2 | 2.138 | 15.432 | 68.609 |
| a3 | 43.154 | 31.715 | 7.118 |
| a4 | 1.920 | 13.358 | 37.955 |

Figure 11:
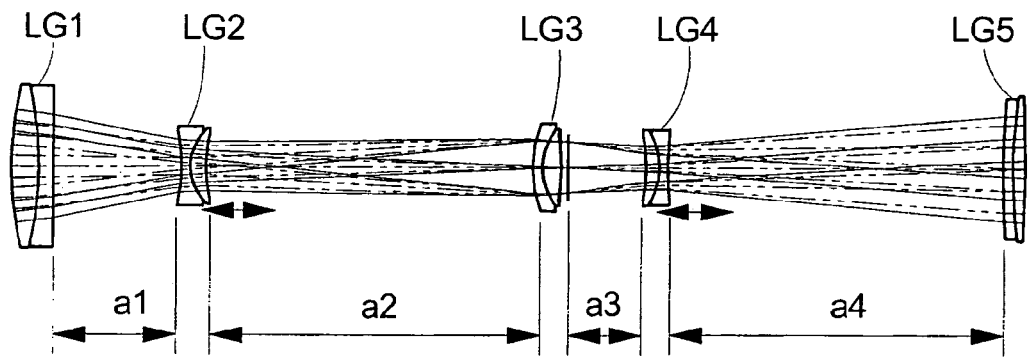
FIG. 11 shows a third constructional variant with five optical assemblies and a structural length of 160 mm.

The zoom system according to the invention shown in FIG. 11 comprises five optical assemblies at a structural length of 160 mm and has the following system specifications:

| Plane or lens group | Radius r | Thickness d | Variable distance | Index of refraction $n_e$ | Abbe number $v_e$ |
|---|---|---|---|---|---|
| Infinity space from objective | | | | | |
| LG1 | 54.41669 | | | | |
| | | 4.50000 | | 1.530190 | 76.58 |
| | −53.24124 | | | | |
| | | 2.30000 | | 1.584820 | 40.57 |
| | −23179.171 | | | | |
| | | | a1 | | |
| LG2 | −29.65255 | | | | |
| | | 1.40000 | | 1.747910 | 44.57 |
| | 8.37016 | | | | |
| | | 2.50000 | | 1.812659 | 25.16 |
| | 23.91363 | | | | |
| | | | a2 | | |
| LG3 | 18.62642 | | | | |
| | | 1.55000 | | 1.708240 | 39.12 |
| | 9.95934 | | | | |
| | | 3.00000 | | 1.530190 | 76.58 |
| | −35.01484 | | | | |
| | | 1.00000 | | | |
| Aperture | infinity | | | | |
| | | | a3 | | |
| LG4 | −28.91998 | | | | |
| | | 2.10000 | | 1.812659 | 25.16 |
| | −11.51291 | | | | |
| | | 1.30000 | | 1.747910 | 44.57 |
| | 46.94391 | | | | |
| | | | a4 | | |
| LG5 | 159.19894 | | | | |
| | | 1.50000 | | 1.708240 | 39.12 |
| | 81.58989 | | | | |
| | | 2.00000 | | 1.489140 | 70.99 |
| | −229.49361 | | | | |
| Infinity space from tube lens | | | | | |

Figure 12:
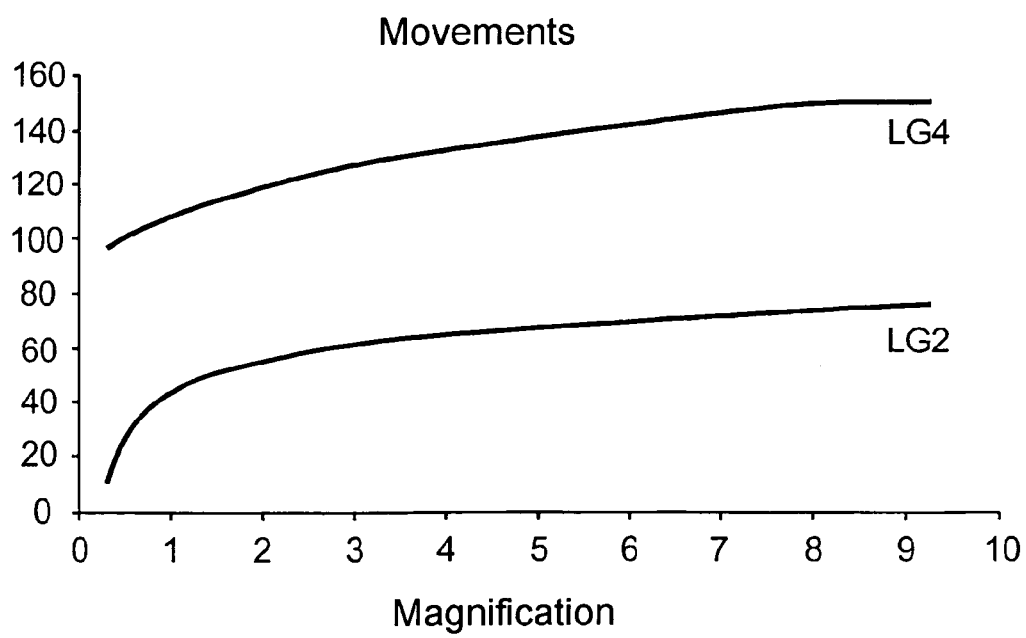
FIG. 12 shows the movement characteristic of the zoom system from FIG. 11.

The movement characteristic of the zoom system from FIG. 11 is shown in FIG. 12. It can be seen that the initial magnification value is 0.30 and the final value is 9.00 and the magnification range is accordingly 30.0×. Selected magnifications result with the following distance settings:

|    | Magnification | | |
|----|---------|---------|---------|
|    | 9.00×   | 3.31×   | 0.30×   |
| a1 | 69.688  | 56.490  | 3.698   |
| a2 | 2.138   | 15.336  | 68.128  |
| a3 | 63.059  | 23.234  | 8.411   |
| a4 | 1.967   | 33.862  | 56.615  |

Figure 13:
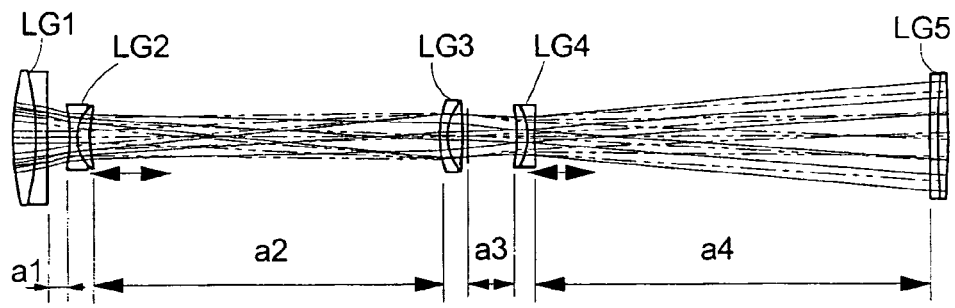
FIG. 13 shows a fourth constructional variant with five optical assemblies and a structural length of 180 mm.

The zoom system according to the invention shown in FIG. 13 comprises five optical assemblies at a structural length of 180 mm and has the following system specifications:

| Plane or lens group | Radius r | Thickness d | Variable distance | Index of refraction $n_e$ | Abbe number $v_e$ |
|---|---|---|---|---|---|
| Infinity space from objective | | | | | |
| LG1 | 54.18919 | | | | |
| | 4.50000 | | | 1.530190 | 76.58 |
| | -52.34592 | | | | |
| | 2.30000 | | | 1.584820 | 40.57 |
| | -16391.102 | | | | |
| | | | a1 | | |
| LG2 | -29.79285 | | | | |
| | 1.40000 | | | 1.747910 | 44.57 |
| | 8.12478 | | | | |
| | 2.50000 | | | 1.812659 | 25.16 |
| | 22.97472 | | | | |
| | | | a2 | | |
| LG3 | 19.38349 | | | | |
| | 1.55000 | | | 1.708240 | 39.12 |
| | 10.35778 | | | | |
| | 3.00000 | | | 1.530190 | 76.58 |
| | -36.27659 | | | | |
| Aperture | 1.00000 | | | | |
| | infinity | | | | |
| | | | a3 | | |
| LG4 | -29.29687 | | | | |
| | 2.10000 | | | 1.812659 | 25.16 |
| | -12.25144 | | | | |
| | 1.30000 | | | 1.747910 | 44.57 |
| | 56.73263 | | | | |
| | | | a4 | | |
| LG5 | 402.00502 | | | | |
| | 1.50000 | | | 1.708240 | 39.12 |
| | 147.33917 | | | | |
| | 2.00000 | | | 1.489140 | 70.99 |
| | -182.38036 | | | | |
| Infinity space from tube lens | | | | | |

Figure 14:
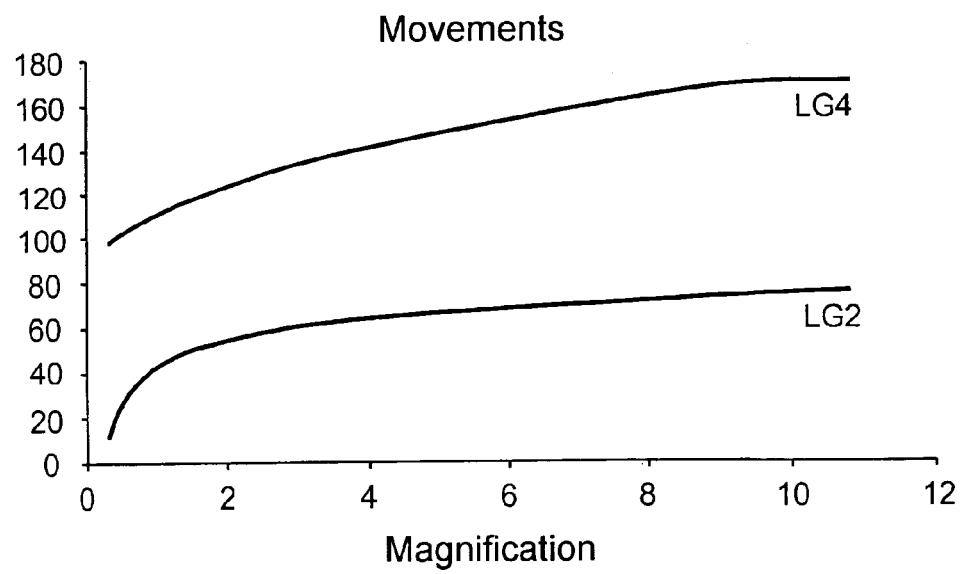
FIG. 14 shows the movement characteristics of the zoom system from FIG. 13.

The movement characteristic of the zoom system from FIG. 13 is shown in FIG. 14. It can be seen that the initial magnification value is 0.30 and the final value is 10.50 and the magnification range is accordingly 35.0×. Selected magnifications result with the following distance settings:

|    | Magnification | | |
|----|---------|---------|---------|
|    | 10.50×  | 3.54×   | 0.30×   |
| a1 | 69.688  | 56.613  | 4.310   |
| a2 | 2.138   | 15.213  | 67.516  |
| a3 | 83.008  | 51.170  | 9.573   |
| a4 | 2.025   | 33.862  | 75.459  |

While the foregoing description and drawings represent the present invention, it will be obvious to those skilled in the art that various changes may be made therein without departing from the true spirit of the present invention.

What is claimed is:

1. An afocal zoom system comprising:
at least four optical assemblies, two of which assemblies are movable relative to one another and to the rest of the assemblies for the purpose of changing the magnification, wherein every adjustable magnification can be achieved by a displacing movement of the two movable optical assemblies in the same direction,
comprising four optical assemblies, of which, beginning on the object side, a first assembly is stationary with positive refractive power, a second assembly is movable with negative refractive power, a third assembly is stationary with positive refractive power, and a fourth assembly is movable with negative refractive power,
wherein the two movable assemblies are movable at different displacement speeds, wherein the magnification is lowest at their shortest distance from the first assembly.

2. The afocal zoom system according to claim 1, constructed for a zoom range of greater than 12.

3. The afocal zoom system according to claim 1, constructed for a structural length of 130 mm with the following characteristic quantities:

| Plane or lens group | Radius r | Thickness d | Variable distance | Index of refraction $n_e$ | Abbe number $v_e$ |
|---|---|---|---|---|---|
| Infinity space from objective | | | | | |
| LG1 | 55.83000 | | | | |
| | | 4.50000 | | 1.530190 | 76.58 |
| | -55.83000 | | | | |
| | | 2.30000 | | 1.584820 | 40.57 |
| | infinity | | | | |
| | | | a1 | | |
| LG2 | -35.22750 | | | | |
| | | 1.40000 | | 1.747910 | 44.57 |
| | 9.17300 | | | | |
| | | 2.50000 | | 1.812659 | 25.16 |
| | 25.12050 | | | | |
| | | | a2 | | |
| LG3 | 30.06750 | | | | |
| | | 1.50000 | | 1.812659 | 25.16 |
| | 15.07000 | | | | |
| | | 1.80000 | | 1.489140 | 70.23 |
| | 18.96900 | | | | |
| | | 2.90000 | | 1.716160 | 53.61 |
| | -44.98960 | | | | |
| Aperture | 1.00000 | | | | |
| | infinity | | | | |
| | | | a3 | | |
| LG4 | -47.65660 | | | | |
| | | 1.30000 | | 1.620680 | 49.54 |
| | 7.94400 | | | | |
| | | 2.90000 | | 1.624080 | 36.11 |
| | 41.86920 | | | | |
| | | | a4 | | |

-continued

| Infinity space from tube lens | | | |
|---|---|---|---|
| | Magnification | | |
| | 4.0× | 1.0× | 0.32× |
| a1 | 68.657 | 39.472 | 2.098 |
| a2 | 11.189 | 40.373 | 77.747 |
| a3 | 28.039 | 12.818 | 3.104 |
| a4 | 0.016 | 15.237 | 24.951. |

4. The afocal zoom system according to claim 1, constructed for a structural length of 160 mm with the following characteristic quantities:

| Plane or lens group | Radius r | Thickness d | Variable distance | Index of refraction $n_e$ | Abbe number $v_e$ |
|---|---|---|---|---|---|
| Infinity space from objective | | | | | |
| LG1 | 56.75149 | | | | |
| | | 1.80000 | | 1.584820 | 40.57 |
| | 34.34561 | | | | |
| | | 3.23632 | | 1.487940 | 84.07 |
| | 399.82663 | | | | |
| | | | a1 | | |
| LG2 | −42.51193 | | | | |
| | | 1.20000 | | 1.747910 | 44.44 |
| | 12.24683 | | | | |
| | | 2.43354 | | 1.812639 | 25.16 |
| | 35.41005 | | | | |
| | | | a2 | | |
| LG3 | 27.81808 | | | | |
| | | 1.50000 | | 1.616640 | 44.27 |
| | 11.53722 | | | | |
| | | 3.35345 | | 1.530190 | 76.58 |
| | −38.54358 | | | | |
| Aperture | infinity | 2.00000 | | | |
| | | | a3 | | |
| LG4 | −35.44956 | | | | |
| | | 2.96303 | | 1.652220 | 33.60 |
| | −11.34526 | | | | |
| | | 1.30000 | | 1.620680 | 49.54 |
| | 86.38284 | | | | |
| | | | a4 | | |

| Infinity space from tube lens | | | |
|---|---|---|---|
| | Magnification | | |
| | 4.75× | 1.25× | 0.32× |
| a1 | 90.889 | 57.703 | 2.392 |
| a2 | 5.936 | 39.122 | 94.433 |
| a3 | 44.126 | 17.262 | 2.244 |
| a4 | 0.000 | 26.864 | 41.882. |

5. The afocal zoom system according to claim 1, constructed for a structural length of 197 mm with the following characteristic quantities:

| Plane or lens group | Radius r | Thickness d | Variable distance | Index of refraction $n_e$ | Abbe number $v_e$ |
|---|---|---|---|---|---|
| Infinity space from objective | | | | | |
| LG1 | 59.45081 | | | | |
| | | 1.80000 | | 1.584820 | 40.57 |
| | 36.56531 | | | | |
| | | 3.09611 | | 1.487940 | 84.07 |
| | 323.75358 | | | | |
| | | | a1 | | |
| LG2 | −47.70503 | | | | |
| | | 1.20000 | | 1.747910 | 44.44 |
| | 13.26264 | | | | |
| | | 2.44516 | | 1.812639 | 25.16 |
| | 37.95059 | | | | |
| | | | a2 | | |
| LG3 | 31.52821 | | | | |
| | | 1.50000 | | 1.616640 | 44.27 |
| | 13.05517 | | | | |
| | | 3.14976 | | 1.530190 | 76.58 |
| | −46.21433 | | | | |
| Aperture | infinity | 2.00000 | | | |
| | | | a3 | | |
| LG4 | −46.50621 | | | | |
| | | 3.63255 | | 1.652220 | 33.60 |
| | −13.80465 | | | | |
| | | 1.30000 | | 1.620680 | 49.54 |
| | 82.22593 | | | | |
| | | | a4 | | |

| Infinity space from tube lens | | | |
|---|---|---|---|
| | Magnification | | |
| | 5.43× | 1.27× | 0.32× |
| a1 | 90.390 | 61.772 | 2.409 |
| a2 | 5.284 | 40.902 | 100.265 |
| a3 | 73.960 | 23.866 | 2.328 |
| a4 | 0.000 | 50.094 | 71.632. |

6. The afocal zoom system according to claim 1, wherein the movable optical assemblies are connected to drive devices which are constructed as drum cams, as a rack and pinion with positive control by means of a cam disk, as a positive control by means of a plurality of cam disks, as a direct motor drive, preferably with stepper motor, or as a lever system with differential movement and positive control by means of a cam disk.

7. The zoom system comprising at least five optical assemblies, two of which assemblies are movable relative to one another and to the rest of the assemblies for the purpose of changing the magnification, wherein every adjustable magnification can be achieved by a displacing movement of the two movable optical assemblies in the same direction, five optical assemblies, of which, beginning on the object side, a first assembly is stationary with positive refractive power, a second assembly is movable with negative refractive power, a third assembly is stationary with positive refractive power, a fourth assembly is movable with negative refractive power, and a fifth assembly is stationary with positive refractive powers
wherein the two movable assemblies are movable at different displacement speeds, wherein the adjusted magnification is lowest at the shortest distance from the first assembly.

8. The afocal zoom system according to claim 7, constructed for a zoom range of greater than 20.

9. The afocal zoom system according to claim 7, constructed for a structural length of 130 mm with the following characteristic quantities:

| Plane or lens group | Radius r | Thickness d | Variable distance | Index of refraction $n_e$ | Abbe number $\nu_e$ |
|---|---|---|---|---|---|
| Infinity space from objective | | | | | |
| LG1 | 55.83000 | | | | |
|  | | 4.50000 | | 1.530190 | 76.58 |
|  | −55.83000 | | | | |
|  | | 2.30000 | | 1.584820 | 40.57 |
|  | infinity | | | | |
|  | | | a1 | | |
| LG2 | −29.63900 | | | | |
|  | | 1.40000 | | 1.747910 | 44.57 |
|  | 9.57600 | | | | |
|  | | 2.50000 | | 1.812659 | 25.16 |
|  | 28.59370 | | | | |
|  | | | a2 | | |
| LG3 | 17.66550 | | | | |
|  | | 1.40000 | | 1.708240 | 39.12 |
|  | 9.44240 | | | | |
|  | | 3.15000 | | 1.530190 | 76.58 |
|  | −30.94640 | | | | |
| Aperture | | 1.00000 | | | |
|  | infinity | | | | |
|  | | | a3 | | |
| LG4 | −27.97950 | | | | |
|  | | 2.10000 | | 1.812659 | 25.16 |
|  | −10.59190 | | | | |
|  | | 1.30000 | | 1.747910 | 44.57 |
|  | 38.12900 | | | | |
|  | | | a4 | | |
| LG5 | 54.24520 | | | | |
|  | | 2.05000 | | 1.708240 | 39.12 |
|  | 33.25480 | | | | |
|  | | 2.28000 | | 1.489140 | 70.23 |
|  | infinity | | | | |

| Infinity space from tube lens | | | |
|---|---|---|---|
| Magnification | | | |
|  | 6.00× | 2.00× | 0.30× |
| a1 | 69.713 | 51.441 | 2.608 |
| a2 | 2.034 | 20.306 | 69.139 |
| a3 | 32.226 | 20.448 | 4.346 |
| a4 | 2.047 | 13.824 | 29.927. |

10. The afocal zoom system according to claim 7, constructed for a structural length of 140 mm with the following characteristic quantities:

| Plane or lens group | Radius r | Thickness d | Variable distance | Index of refraction $n_e$ | Abbe number $\nu_e$ |
|---|---|---|---|---|---|
| Infinity space from objective | | | | | |
| LG1 | 54.46484 | | | | |
|  | | 4.50000 | | 1.530190 | 76.58 |
|  | −54.53767 | | | | |
|  | | 2.30000 | | 1.584820 | 40.57 |
|  | 95114.5695 | | | | |
|  | | | a1 | | |
| LG2 | −28.70630 | | | | |
|  | | 1.40000 | | 1.747910 | 44.57 |
|  | 8.84044 | | | | |
|  | | 2.50000 | | 1.812659 | 25.16 |
|  | 26.08074 | | | | |
|  | | | a2 | | |
| LG3 | 17.64930 | | | | |
|  | | 1.55000 | | 1.708240 | 39.12 |
|  | 9.44423 | | | | |
|  | | 3.00000 | | 1.530190 | 76.58 |
|  | −33.13612 | | | | |
| Aperture | | 1.00000 | | | |
|  | infinity | | | | |
|  | | | a3 | | |
| LG4 | −26.24859 | | | | |
|  | | 2.10000 | | 1.812659 | 25.16 |
|  | −10.15678 | | | | |
|  | | 1.30000 | | 1.747910 | 44.57 |
|  | 39.51109 | | | | |
|  | | | a4 | | |
| LG5 | 73.94310 | | | | |
|  | | 1.50000 | | 1.708240 | 39.12 |
|  | 42.44389 | | | | |
|  | | 2.00000 | | 1.489140 | 70.23 |
|  | −320.03785 | | | | |

| Infinity space from tube lens | | | |
|---|---|---|---|
| Magnification | | | |
|  | 7.50× | 3.08× | 0.30× |
| a1 | 69.688 | 53.394 | 3.216 |
| a2 | 2.138 | 15.432 | 68.609 |
| a3 | 43.154 | 31.715 | 7.118 |
| a4 | 1.920 | 13.358 | 37.955. |

11. The afocal zoom system according to claim 7, constructed for a structural length of 160 mm with the following characteristic quantities:

| Plane or lens group | Radius r | Thickness d | Variable distance | Index of refraction $n_e$ | Abbe number $\nu_e$ |
|---|---|---|---|---|---|
| Infinity space from objective | | | | | |
| LG1 | 54.41669 | | | | |
|  | | 4.50000 | | 1.530190 | 76.58 |
|  | −53.24124 | | | | |
|  | | 2.30000 | | 1.584820 | 40.57 |
|  | −23179.171 | | | | |
|  | | | a1 | | |
| LG2 | −29.65255 | | | | |
|  | | 1.40000 | | 1.747910 | 44.57 |
|  | 8.37016 | | | | |
|  | | 2.50000 | | 1.812659 | 25.16 |
|  | 23.91363 | | | | |
|  | | | a2 | | |
| LG3 | 18.62642 | | | | |
|  | | 1.55000 | | 1.708240 | 39.12 |
|  | 9.95934 | | | | |
|  | | 3.00000 | | 1.530190 | 76.58 |
|  | −35.01484 | | | | |
| Aperture | | 1.00000 | | | |
|  | infinity | | | | |
|  | | | a3 | | |
| LG4 | −28.91998 | | | | |
|  | | 2.10000 | | 1.812659 | 25.16 |
|  | −11.51291 | | | | |
|  | | 1.30000 | | 1.747910 | 44.57 |
|  | 46.94391 | | | | |
|  | | | a4 | | |
| LG5 | 159.19894 | | | | |
|  | | 1.50000 | | 1.708240 | 39.12 |
|  | 81.58989 | | | | |

-continued

|  | Radius | Thickness | Variable distance | Index of refraction $n_e$ | Abbe number $v_e$ |
|---|---|---|---|---|---|
|  | −229.49361 | 2.00000 |  | 1.489140 | 70.99 |

Infinity space from tube lens

Magnification

|  | 9.00× | 3.31× | 0.30× |
|---|---|---|---|
| a1 | 69.688 | 56.490 | 3.698 |
| a2 | 2.138 | 15.336 | 68.128 |
| a3 | 63.059 | 23.234 | 8.411 |
| a4 | 1.967 | 33.862 | 56.615. |

12. The afocal zoom system according to claim 7, constructed for a structural length of 180 mm with the following characteristic quantities:

| Plane or lens group | Radius r | Thickness d | Variable distance | Index of refraction $n_e$ | Abbe number $v_e$ |
|---|---|---|---|---|---|
| Infinity space from objective |  |  |  |  |  |
| LG1 | 54.18919 |  |  |  |  |
|  |  | 4.50000 |  | 1.530190 | 76.58 |
|  | −52.34592 |  |  |  |  |
|  |  | 2.30000 |  | 1.584820 | 40.57 |
|  | −16391.102 |  |  |  |  |
|  |  |  | a1 |  |  |
| LG2 | −29.79285 |  |  |  |  |
|  |  | 1.40000 |  | 1.747910 | 44.57 |
|  | 8.12478 |  |  |  |  |
|  |  | 2.50000 |  | 1.812659 | 25.16 |
|  | 22.97472 |  |  |  |  |
|  |  |  | a2 |  |  |
| LG3 | 19.38349 |  |  |  |  |
|  |  | 1.55000 |  | 1.708240 | 39.12 |
|  | 10.35778 |  |  |  |  |
|  |  | 3.00000 |  | 1.530190 | 76.58 |
|  | −36.27659 |  |  |  |  |
| Aperture |  | 1.00000 |  |  |  |
|  | infinity |  |  |  |  |
|  |  |  | a3 |  |  |
| LG4 | −29.29687 |  |  |  |  |
|  |  | 2.10000 |  | 1.812659 | 25.16 |
|  | −12.25144 |  |  |  |  |
|  |  | 1.30000 |  | 1.747910 | 44.57 |
|  | 56.73263 |  |  |  |  |
|  |  |  | a4 |  |  |
| LG5 | 402.00502 |  |  |  |  |
|  |  | 1.50000 |  | 1.708240 | 39.12 |
|  | 147.33917 |  |  |  |  |
|  |  | 2.00000 |  | 1.489140 | 70.99 |
|  | −182.38036 |  |  |  |  |

Infinity space from tube lens

Magnification

|  | 10.50× | 3.54× | 0.30× |
|---|---|---|---|
| a1 | 69.688 | 56.613 | 4.310 |
| a2 | 2.138 | 15.213 | 67.516 |
| a3 | 83.008 | 51.170 | 9.573 |
| a4 | 2.025 | 33.862 | 75.459. |

\* \* \* \* \*